March 19, 1935. M. PRÜSS 1,995,224
SETTLING POND
Filed Dec. 31, 1930
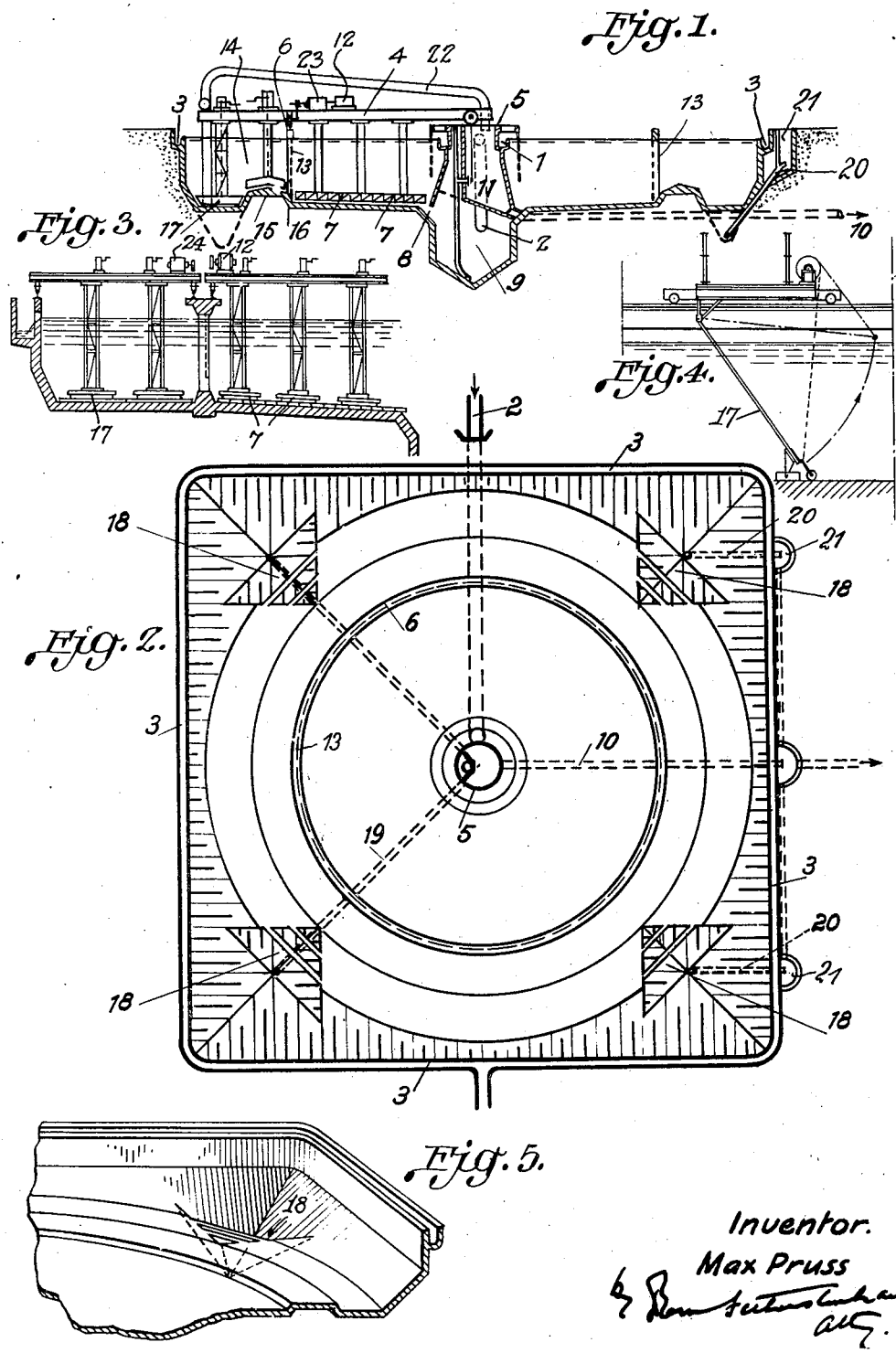
Inventor.
Max Pruss Patented Mar. 19, 1935

1,995,224

UNITED STATES PATENT OFFICE 1,995,224

SETTLING POND

Max Prüss, Essen, Germany

Application December 31, 1930, Serial No. 505,859
In Germany October 22, 1929

8 Claims. (Cl. 209—208)

My invention relates to improvements in settling ponds of flat circular or square shape from which the settled mud is removed toward the center of the pond by means of rotating scrapers, the liquid to be purified flowing radially through the pond.

In settling ponds of this type the removal of the settled mud has been realized hitherto by appliances which push the mud from the entire floor of the pond to a common pump pit arranged in the center of the pond. These known appliances have a satisfactory effect with diameters of the pond of about 20 to 30 m., with greater diameters, however, certain difficulties are encountered which are eliminated by the present invention. To this end I provide an outer separate fine settling space in the pond. By this subdivision of the settling pond into an inner coarse settling space and an outer circular fine settling space surrounding the former the following advantages are afforded:

1. A calming and distributing rake can be arranged between the two settling spaces by which rake the radially flowing waste water is calmed again and uniformly distributed on the entire pond before entering the outer fine settling space. This repeated calming of the water is of particular advantage, because by the permanent operation of the rotating mud scrapers the whole content of the pond is set into circular motion whereby the velocity of flow of the water is increased and the settling effect reduced in so far that the finest mud particles cannot settle. Furthermore, the calming rake suppresses the tangential motion of the water before it enters the fine settling space.

2. Any re-whirling-up of the finest mud particles settled on the floor of the fine settling space by the water flowing above them can be prevented by arranging the floor of this space at a lower level than that of the coarse settling space, or by providing a sill of sufficient height between the two settling spaces which keeps the radially flowing current of the water to be purified away from the floor of the fine settling space.

3. If the mud is removed separately from the two settling spaces the rotating scraper belonging to the fine settling space needs operate much less frequently owing to the little deposit of mud therein than the inner scraper which has to remove to the center of the pond the larger mud quantities settled in the coarse settling space. In this manner not only the period of time in which a whirling-up of the mud in the fine settling space could occur by the motion of the scraper, is reduced to not more than 1 to 2 hours a day, but the possibility is further given to drive this scraper so slowly that any tangential motion of the water in the fine settling space by the rotation of the scraper is avoided under all circumstances. The inner scraper can then revolve without danger at such a speed that only one such scraper will be sufficient.

4. The separate removal of the mud from the two settling spaces affords the possibility of separating the mud coming from the fine settling space from that of the coarse settling space. This is of particular importance in the purification of waste water which is purified by activated sludge. In plants of this kind the finest mud which only after a long settling time deposits near the outer wall of the pond and then has to travel the long way from this outer wall to the central mud draining pit, remains without artificial ventilation for such a long time, that when drained, the mud is not longer sufficiently active for the further purifying work. When removed separately as provided by the invention, this fine mud can previously be subjected to an intermediate ventilation or removed as excess mud.

In order that my invention can be more readily understood, a preferred embodiment of the same is illustrated by way of example in the accompanying drawing in which Figure 1 is a vertical cross section through a settling pond designed in accordance with the invention, while Figure 2 is the corresponding plan view.

Fig. 3 shows in cross section the rake portion of a modified form of the invention.

Fig. 4 shows in detail one of the rake elements.

Fig. 5 is a perspective view of one of the corners of the tank.

The settling pond may have circular or the square shape illustrated. The water to be treated is fed through a siphon pipe 2, Figure 2, to a central annular trough 1. Another trough 3 arranged on the periphery of the pond serves to receive the purified water. A rotary girder 4 the wheels of which run on tracks 5 and 6 but which may float in known manner on the water, has suspended from it the group of scrapers 7 which on rotation of the girder 4 remove the mud from the inner annular space of the settling pond through the gap 8 to the mud collecting chamber 9. 10 denotes the mud drain pipe through which the mud is drained after its moisture has been examined in the central chamber 11 which is kept dry. The scraper carrier 4 is driven by a motor 12 which acts upon the outer wheel that runs on track 6. Between this track 6 and the outer trough 3 is disposed the fine settling space 14 the outer wall of which may be circular or polygonal. In the embodiment illustrated this space 14 has a square shape. At the outer edge the floor of this fine settling space is situated at a lower level than the adjacent floor of the inner, coarse settling space. In order to securely keep away the current of the radially flowing water from the floor of the outer settling space, the inner edge of the latter rises beyond the adjacent floor of the inner settling space so as to form a sill. Between the two settling spaces is disposed below track 6 the calming rake 13. As shown in Fig. 2 of the drawing the calming member or rake 13 is vertically disposed and extends concentrically around the tank between the settling spaces. The calming member may be constructed of spaced plates or bars as shown, or any equivalent construction such as perforated plates, which permit the flow of the liquid therethrough but obstruct the flow to some degree, may be used.

The removal of the settled mud can be effected in any suitable known manner. In the embodiment shown the scraper carrier 4 is prolonged above the fine settling space 14 and carries there two separate scrapers 15 and 17 hinged thereto as shown in Fig. 4 so as to be lifted. The inner scraper 15 is formed by a plurality of individual scrapers and pushes the mud deposited on the sill toward the center of the pond, the mud thus arriving over the inclined offset 16 between the supports of the track 6 in the range of the inner scrapers 7. The scrapers 15 are so shown, that the left scraper forces the slime into the clarifying chamber 14 and the right scraper 15 in Figure 1 forces the slime into the clarifying chamber 11. The other outer scraper 17 consists of one sole scraper which pushes the mud before it on the floor and delivers it to the outer mud pockets 18 which in the embodiment shown are arranged in the corners of the fine settling space. In this manner also the mud settled on those places of the fine settling space which are not touched by the scraper 17 glides into the pockets 18 on the sloped side walls of the pond. By this simple arrangement the complicated devices are rendered superfluous which otherwise are required to deliver the mud from these corners into the range of the rotating scrapers. Hence, this arrangement of outer mud collecting pockets is of importance for the removal of the mud in all settling ponds of polygonal shape with rotating scrapers of every design, that means also in those having no outer fine settling space. From these pockets 18 the mobile fine mud is then conveyed through mud pipes 19 to the central pit 5 or drained through pipes 20 to the outer mud pits 21.

In lieu of pushing together the mud by the scraper 17 to the mud pockets 18, the mud may also be immediately sucked off in front of the scraper by a mud pump and delivered to the central mud pit.

Between the motor 12 and the scraper carrier 4 is interposed a variable speed gear acting in such a manner that during the period of removal of the mud from the fine settling space the speed of the carrier 4 is very low so that one revolution of the scrapers lasts 1 to 2 hours. This done once a day, the hingedly suspended scrapers 15 and 17 are lifted from the water and the speed of the carrier 4 is increased to such an extent that it makes 4 to 6 revolutions in the hour, whereby then the large quantity of the mud settled on the floor of the inner coarse settling space is entirely removed.

With circular outer settling spaces the scraper carrier 4 may of course be supported also on its outer end by a wheel running on a track, so that the scraper carriers of the outer and inner settling space can be operated entirely independently from one another as for example by motors 12 and 24 as shown in Fig. 3. Such an arrangement is however much more expensive than that illustrated in Figure 1 and does not afford any noteworthy advantage.

What I claim as my invention is:—

1. A settling pond comprising an inner coarse settling space and an outer fine settling space concentric to and in free communication with the former, means for causing the liquid to be purified to flow radially through said coarse settling space, mud scrapers adapted to rotate in said two settling spaces, and a vertical concentric distributing and calming member disposed between the latter and across the radial flow of the liquid to be purified.

2. A settling pond comprising an inner coarse settling space and an outer fine settling space concentric to and in free communication with the former, means for causing the liquid to be purified to flow radially through said coarse settling space, mud scrapers adapted to rotate in said two settling spaces, and a vertical rake disposed between the latter, the floor of said fine settling space being situated at least partly at a level lower than that of said coarse settling space.

3. A settling pond comprising an inner coarse settling space and an outer fine settling space concentric to and in free communication with the former, means for causing the liquid to be purified to flow radially through said coarse settling space, mud scrapers adapted to rotate in said two settling spaces, a vertical rake disposed between the latter, and a raised ridge separating their floors from one another.

4. A settling pond comprising an inner coarse settling space and an outer fine settling space concentric to and in free communication with the former and having a polygonal outer shape and an annular working space, means for causing the liquid to be purified to flow radially through said coarse settling space, and mud scrapers adapted to rotate in the latter and in said annular working space, the corners of the outer polygonal wall of said fine settling space merging by sloped surfaces into said annular working space.

5. A settling pond comprising an inner coarse settling space and an outer fine settling space concentric to and in free communication with the former and having a polygonal outer shape and an annular working space, means for causing the liquid to be purified to flow radially through said coarse settling space, mud scrapers adapted to rotate in the latter and in said annular working space, the corners of the outer polygonal wall of said fine settling space merging by sloped surfaces into said annular working space, mud collecting pockets disposed at said corners between said sloped surfaces and said annular working space, and mud draining means in connection with said pockets.

6. A settling tank comprising an inner space to settle the coarse sludge, an outer space to settle the fine sludge, said spaces being concentric to each other and approximately in free communication from top to bottom, means for causing the liquid to be purified to flow from the center radially through the said settling spaces, mud scrapers adapted to rotate at the bottom of the two settling spaces, means for driving the scraper of the fine settling space at times at a lower angular speed than that of the coarse settling space.

7. A settling tank comprising an inner space to settle the coarse sludge, an outer space to settle the fine sludge, said spaces being concentric to each other and in approximately free communication from top to bottom, means for causing the liquid to be purified to flow from the center radially through the said settling spaces, mud scrapers adapted to rotate in said two settling spaces, carriers for said scrapers and means for varying independently the speeds of rotation of said carriers.

8. A settling tank comprising an inner space to settle the coarse sludge, an outer space to settle the fine sludge, said spaces being concentric to each other and in approximately free communication from top to bottom, means for causing the liquid to be purified to flow from the center radially through the said settling spaces, liquid scrapers, means for rotating said scrapers in said two settling spaces including a common drive for the said two scrapers, and means interposed between said drive and said scrapers for driving them at different angular speeds.

MAX PRÜSS.